United States Patent
Wang

(10) Patent No.: US 10,108,843 B2
(45) Date of Patent: Oct. 23, 2018

(54) ELECTRONIC DEVICE WITH FINGERPRINT IDENTIFICATION FUNCTION

(71) Applicant: MiiCs & Partners (Shenzhen) Co., Ltd., Shenzhen (CN)

(72) Inventor: Juan Wang, Shenzhen (CN)

(73) Assignees: INTERFACE OPTOELECTRONIC (CHENGDU) CO., LTD, Chengdu (CN); INTERFACE OPTOELECTRONICS (SHENZHEN) CO., Shenzhen (CN)

( * ) Notice: Subject to any disclaimer, the term of this patent is extended or adjusted under 35 U.S.C. 154(b) by 125 days.

(21) Appl. No.: 15/400,997

(22) Filed: Jan. 7, 2017

(65) Prior Publication Data
US 2018/0025208 A1      Jan. 25, 2018

(30) Foreign Application Priority Data
Jul. 25, 2016   (CN) .......................... 2016 1 0588031

(51) Int. Cl.
*G06K 9/00*      (2006.01)
(52) U.S. Cl.
CPC ....... *G06K 9/00087* (2013.01); *G06K 9/0002* (2013.01)
(58) Field of Classification Search
CPC ... A61B 5/6833; A61B 5/1128; A61B 5/1172; A61B 5/6826
USPC ................ 382/115, 116, 124, 209, 278, 141; 340/5.52, 5.53, 5.83; 348/86
See application file for complete search history.

(56) References Cited

U.S. PATENT DOCUMENTS

| | | | | |
|---|---|---|---|---|
| 5,022,978 A | * | 6/1991 | Hensel ................... | C23C 14/35 204/192.12 |
| 6,254,980 B1 | * | 7/2001 | Tadokoro ............... | C09D 5/082 252/389.52 |
| 7,147,153 B2 | * | 12/2006 | Rowe ................... | A61B 5/1171 235/382 |
| 7,366,331 B2 | * | 4/2008 | Higuchi ............. | G06K 9/00046 340/5.53 |
| 7,550,707 B2 | * | 6/2009 | Hashimoto .............. | G06K 9/20 250/221 |
| 8,031,916 B2 | * | 10/2011 | Abiko ................ | G06K 9/00919 283/68 |
| 8,335,353 B2 | * | 12/2012 | Yamamoto ............ | A61B 5/117 382/115 |

* cited by examiner

*Primary Examiner* — Yosef Kassa
(74) *Attorney, Agent, or Firm* — ScienBiziP, P.C.

(57) ABSTRACT

An electronic device able to identify fingerprints ultrasonically includes a substrate, a fingerprint identification structure, and an adhesive layer. The fingerprint identification structure includes a thin film transistor (TFT) substrate and a flexible printed circuit (FPC). The FPC includes a first portion and a second portion. The first portion is located on a surface of the TFT substrate facing away from the substrate. The second portion is extended from an end of the first portion to be electrically connected to a surface of the TFT substrate facing the substrate. The second portion is separated from the adhesive layer. A space is defined between the second portion and the substrate. The adhesive layer is susceptible to deformation and decomposition from environmental conditions.

16 Claims, 8 Drawing Sheets

ELECTRONIC DEVICE WITH FINGERPRINT IDENTIFICATION FUNCTION

CROSS-REFERENCE TO RELATED APPLICATIONS

This application claims priority to Chinese Patent Application No. 201610588031.2 filed on Jul. 25, 2016, the contents of which are incorporated by reference herein.

FIELD

The subject matter herein generally relates to data security.

BACKGROUND

As shown in FIG. 8, an electronic device with fingerprint identification function 200 can include a substrate 201, an adhesive layer 202, and a fingerprint identification structure 203. The adhesive layer 202 joins the substrate 201 and the fingerprint identification structure 203 together. The fingerprint identification structure 203 includes a thin film transistor (TFT) substrate 204, a transmitting layer 205, a receiving layer 206, and a flexible printed circuit (FPC) 207. The transmitting layer 205 and the receiving layer 206 are each located on one of the two opposite surfaces of the TFT substrate 204. The FPC 207 is attached to a side of the transmitting layer 205 facing away from the receiving layer 206. An end of the FPC 207 is bent to connect a bottom surface of the TFT substrate 204 and is located adjacent to the receiving layer 206. The receiving layer 206 and the FPC 207 are positioned on and pasted on a same surface of the adhesive layer 202. The adhesive layer 202 is susceptible to deformation and decomposition from environmental conditions (e.g. variations in external temperature) and age. Due to a tendency of the adhesive layer 202 to shrink, the FPC 207 is often unintentionally detached from the TFT substrate 204. A better structure of the electronic device with a fingerprint identification apparatus 200 is needed.

BRIEF DESCRIPTION OF THE FIGURES

Implementations of the present technology will now be described, by way of example only, with reference to the attached figures.

DETAILED DESCRIPTION

Figure 1:
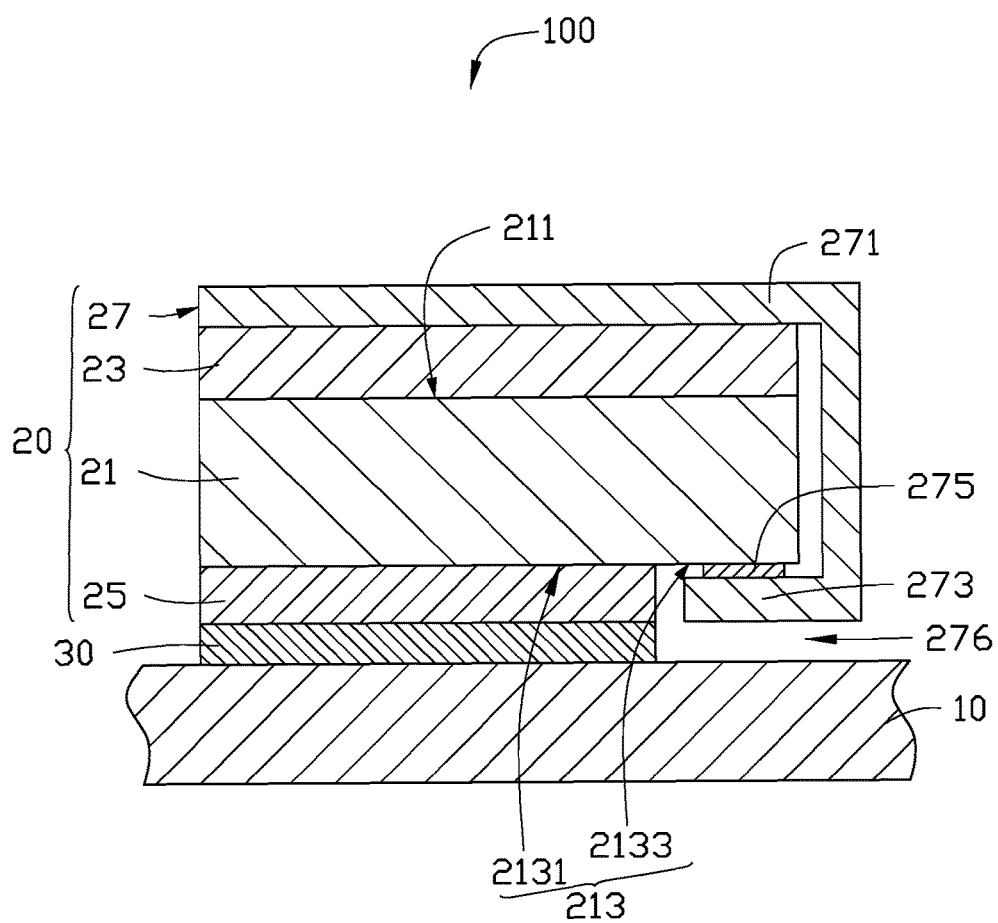
FIG. 1 is cross-sectional view of a first exemplary embodiment of an electronic device with fingerprint identification function, the electronic device comprises a thin film transistor (TFT) substrate.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

The present disclosure is described in relation to an electronic device with fingerprint identification function.

FIG. 1 illustrates an exemplary embodiment of an electronic device 100 with fingerprint identification function. In at least one exemplary embodiment, the electronic device 100 can be for example a mobile phone, a watch, or a tablet with a fingerprint identification function. The electronic device 100 includes a substrate 10, a fingerprint identification structure 20, and an adhesive layer 30 between the substrate 10 and the fingerprint identification structure 20. The adhesive layer 30 joins the substrate 10 and the fingerprint identification structure 20 together.

The substrate 10 is substantially rectangular. In at least one exemplary embodiment, the substrate 10 is made of glass. The substrate 10 can prevent dust from entering into the electronic device 100. In other embodiments, the substrate 10 can be made of one or more of the following materials, or equivalents thereof; metal or compounds thereof (for example, aluminum, magnesium alloy, and aluminum oxide), plastic film (for example, polymethyl methacrylate, polyethersulfone resin, and polyethylene terephthalate), plastic film sapphire, or compounds thereof. The substrate 10 can be a cover of an electronic device or a cover or part of a cover facing a home key of an electronic device.

Figure 2:
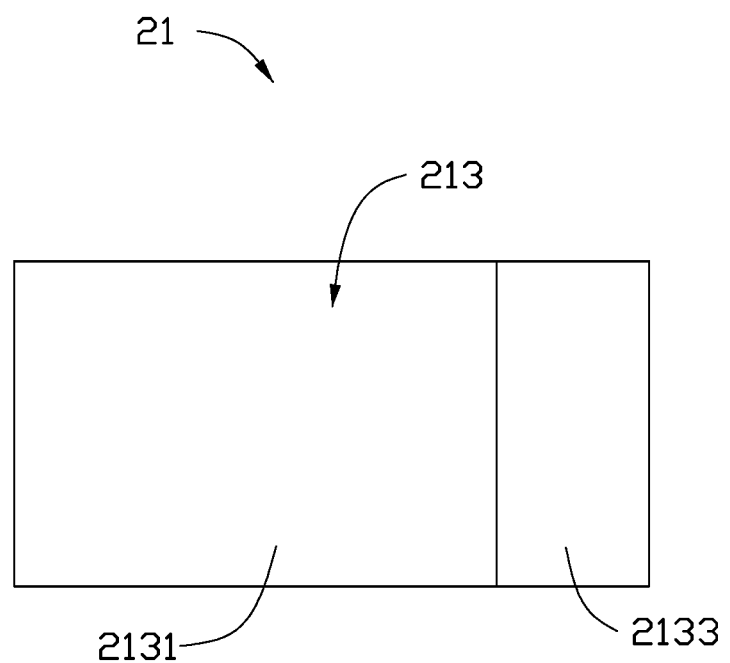
FIG. 2 is a plan view of the TFT substrate of FIG. 1.

The fingerprint identification structure 20 includes a thin film transistor (TFT) substrate 21, a transmitting layer 23, a receiving layer 25, and a flexible printed circuit (FPC) 27. The TFT substrate 21 provides a specified voltage in controlling the transmitting layer 23 to generate ultrasonic signals. In at least one exemplary embodiment, the TFT substrate 21 includes a plurality of TFTs arranged in a matrix, and can form a portion of the display panel of the electronic device 100. The receiving layer 25 converts the ultrasonic signals reflected by an object into electrical signals. The TFT substrate 21 includes a first surface 211 and a second surface 213 opposite to and facing away from the first surface 211. The second surface 213 defines a first region 2131 and a second region 2133. As shown in FIG. 2, an area of the first region 2131 is larger than the second region 2133. The transmitting layer 23 is located on the first surface 211. The receiving layer 25 is located on the second surface 213, and covers the first region 2131. An edge of the receiving layer 25 is aligned with an edge of the first region 2131 adjacent to the second region 2133. The FPC 27 is located on the transmitting layer 23, and is bent to connect to the second region 2133 by extending along the side of the transmitting layer 23 and the side of the TFT substrate 21. The FPC 27 includes a first portion 271, a second portion 273, and a connection portion 275. The first portion 271 is located on a surface of the transmitting layer 23 facing away from the TFT substrate 21. The second portion 273 extends from an end of the first portion 271 to the second region 2133, and covers the side of the transmitting layer 23 and the side of the TFT substrate 21. The second portion 273 is spaced at a distance from the substrate 10 and the adhesive layer 30. The connection portion 275 is positioned to attach the second region 2133 with the second portion 273, and establishes an electrical connection between the second portion 273 and the TFT substrate 21. The second portion 273 above the substrate 10 extends towards the adhesive layer 30 to be adjacent to and spaced apart from the adhesive layer 30. In at least one exemplary embodiment, the connection portion 275 can be metal pins, and such metal pins can connect with the TFT substrate 21 by an anisotropic conductive film (not shown).

The adhesive layer 30 is located between the receiving layer 25 and the substrate 10. The adhesive layer 30 is positioned on and pasted to a surface of the receiving layer 25 opposite to and facing away from the second surface 213. The adhesive layer 30 is further positioned on and pasted to a surface of the substrate 10. Thus, the adhesive layer 30 joins the receiving layer 25 and the substrate 10 together. In at least one exemplary embodiment, the adhesive layer 30 is made of polymer material or equivalents thereof, such as acrylic, epoxy, and silicone.

In the structure of the electronic device 100, the second portion 273 is spaced apart from the substrate 10 and the adhesive layer 30. Thus, deformation due to shrinkage of the adhesive layer 30 does not affect an electronic connection between the FPC 27 and the TFT substrate 21. Therefore, an electric connection stability of the electronic device 100 is improved.

Figure 3:
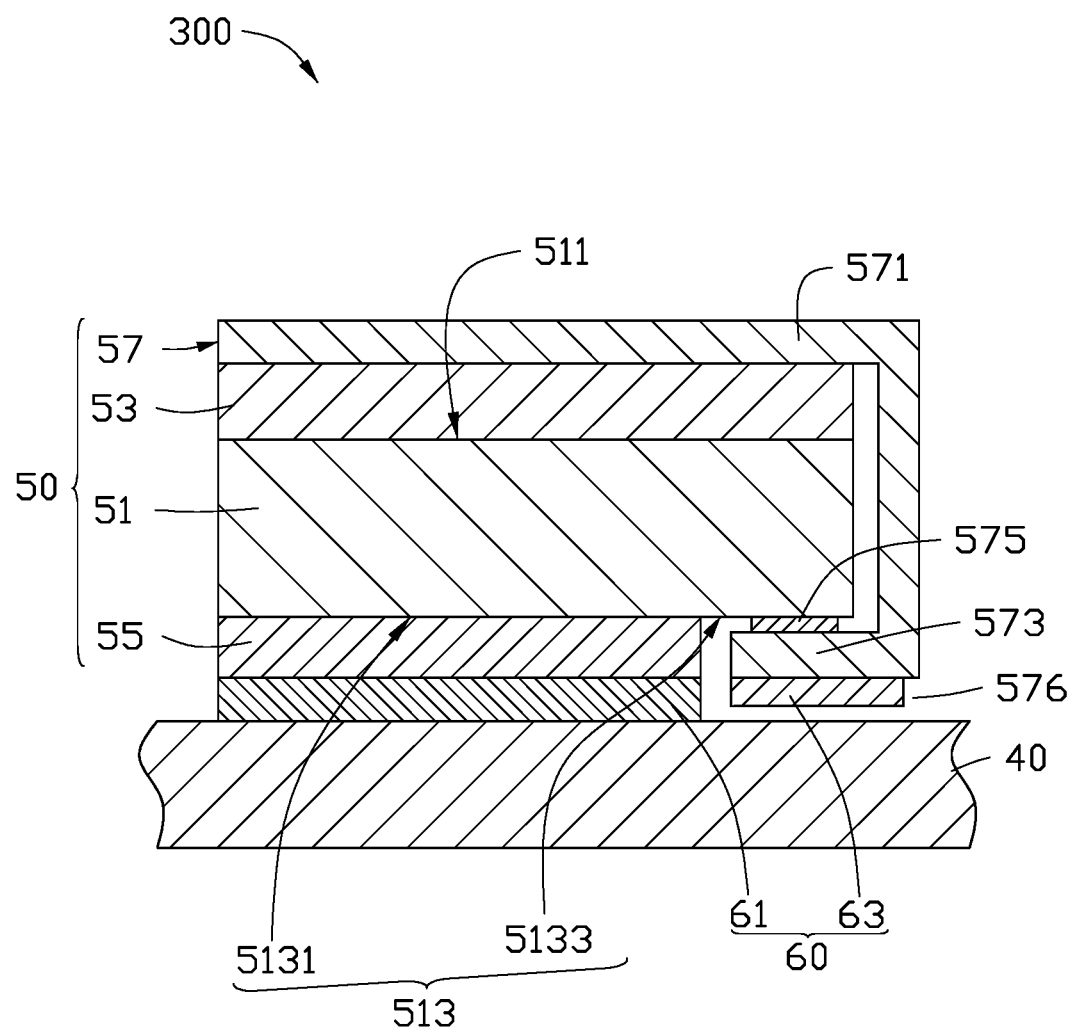
FIG. 3 is a cross-sectional view of a second exemplary embodiment of an electronic device with fingerprint identification function, the electronic device comprises a TFT substrate.

FIG. 3 illustrates a second exemplary embodiment of the electronic device 300. The electronic device 300 according to the second exemplary embodiment is similar to the electronic device 100. The electronic device 300 includes a substrate 40, a fingerprint identification structure 50, and an adhesive layer 60 between the substrate 40 and the fingerprint identification structure 50. The adhesive layer 60 joins the substrate 40 and the fingerprint identification structure 50 together. The differences between the electronic device 300 and the electronic device 100 will now be described.

The substrate 40 is substantially rectangular. In at least one exemplary embodiment, the substrate 40 is made of glass. The substrate 40 can prevent dust from entering into the electronic device 300. In other embodiments, the substrate 10 can be made of the same materials as those used in electronic device 100. The substrate 40 can be functionally the same as that used in electronic device 100.

Figure 4:
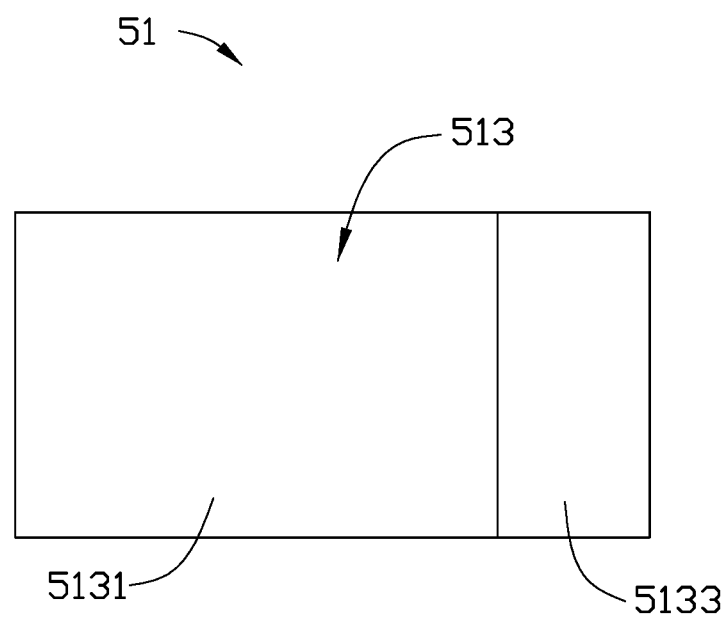
FIG. 4 is a plan view of the TFT substrate of FIG. 3.

The fingerprint identification structure 50 includes a thin film transistor (TFT) substrate 51, a transmitting layer 53, a receiving layer 55, and a flexible printed circuit (FPC) 57. The TFT substrate 51 provides a specified voltage for controlling the transmitting layer 53 to generate ultrasonic signals. In at least one exemplary embodiment, the TFT substrate 51 includes a plurality of TFTs. The TFTs are arranged in a matrix. The receiving layer 55 converts the ultrasonic signals reflected by an object into electrical signals. The TFT substrate 51 includes a first surface 511 facing away from the TFT substrate 51 and a second surface 513 opposite to and facing away from the first surface 511. The second surface 513 defines a first region 5131 and a second region 5133. As shown in FIG. 4, an area of the first region 5131 is larger than the second region 5133. The transmitting layer 53 is located on the first surface 511. The receiving layer 55 is located on the second surface 513 and covers the first region 5131. An edge of the receiving layer 55 is aligned with an edge of the first region 5131 adjacent to the second region 5133. The FPC 57 is located on the transmitting layer 53, and is bent to connect to the second region 5133 by extending along the side of the transmitting layer 53 and the side of the TFT substrate 51. The FPC 57 includes a first portion 571, a second portion 573, and a connection portion 575. The first portion 571 is located on a surface of the transmitting layer 53 facing away from the TFT substrate 51. The second portion 573 extends from an end of the first portion 571 to the second region 5133, and covers the side of the transmitting layer 53 and the side of the TFT substrate 51. The second portion 573 is spaced at a distance from the substrate 40 and the adhesive layer 30. A space 576 is defined between the second portion 573 and the substrate 40. The connection portion 575 establishes an electrical connection between the second portion 573 and the TFT substrate 51. In at least one exemplary embodiment, the connection portion 575 can comprise metal pins, and the connection portion 575 can connect with the TFT substrate 51 by an anisotropic conductive film (not shown).

The adhesive layer 60 is located between the receiving layer 55 and the substrate 40. In at least one exemplary embodiment, the adhesive layer 60 is made of polymer material or equivalents thereof such as acrylic, epoxy, and silicone.

The adhesive layer 60 includes a first adhesive portion 61 and a second adhesive portion 63. The adhesive portion 61 is pasted to a surface of the receiving layer 55 opposite to and facing away from the second surface 513. The adhesive layer 60 is further positioned on and pasted to a surface of the substrate 40. Thus, the adhesive portion 61 joins the receiving layer 55 and the substrate 40 together. The second adhesive portion 63 is received in the space 576. The second adhesive portion 63 is located on the second portion 575. The second adhesive portion 63 covers a bottom surface of the second portion 575 facing the substrate 40, and protects against ingress of water to a surface of the second portion 573 facing the substrate 40. The second adhesive portion 63 is spaced apart from the substrate 40. The space 576 being defined by the surface of the substrate 40, the surface of the second portion 573 facing the substrate 40, and an edge of the second adhesive portion 63. A hardness of the first adhesive portion 61 is equal to a hardness of the second adhesive portion 63. A thickness of the second adhesive portion 63 is less than a distance between the second portion 575 and the substrate 40. The thickness of the second adhesive portion 63 is more than 80% of the distance between the second portion 575 and the substrate 40. In at least one exemplary embodiment, the thickness of the first adhesive portion 61 is larger than a thickness of the second adhesive portion 63. In other embodiments, a thickness of the first adhesive portion 61 is equal to a thickness of the second adhesive portion 63.

In the structure of the electronic device 300, the second adhesive portion 63 is spaced apart from the substrate 40. Thus movement or forces caused by deformation of the second adhesive portion 63 are reduced. Separation of the FPC 57 from the TFT substrate 51 is thus prevented. The second portion 573 is spaced apart from the first adhesive portion 61, and any forces generated by the first adhesive portion 61 have no effect on the FPC 57. Therefore, an electric connection stability of the electronic device 300 is improved.

Figure 5:
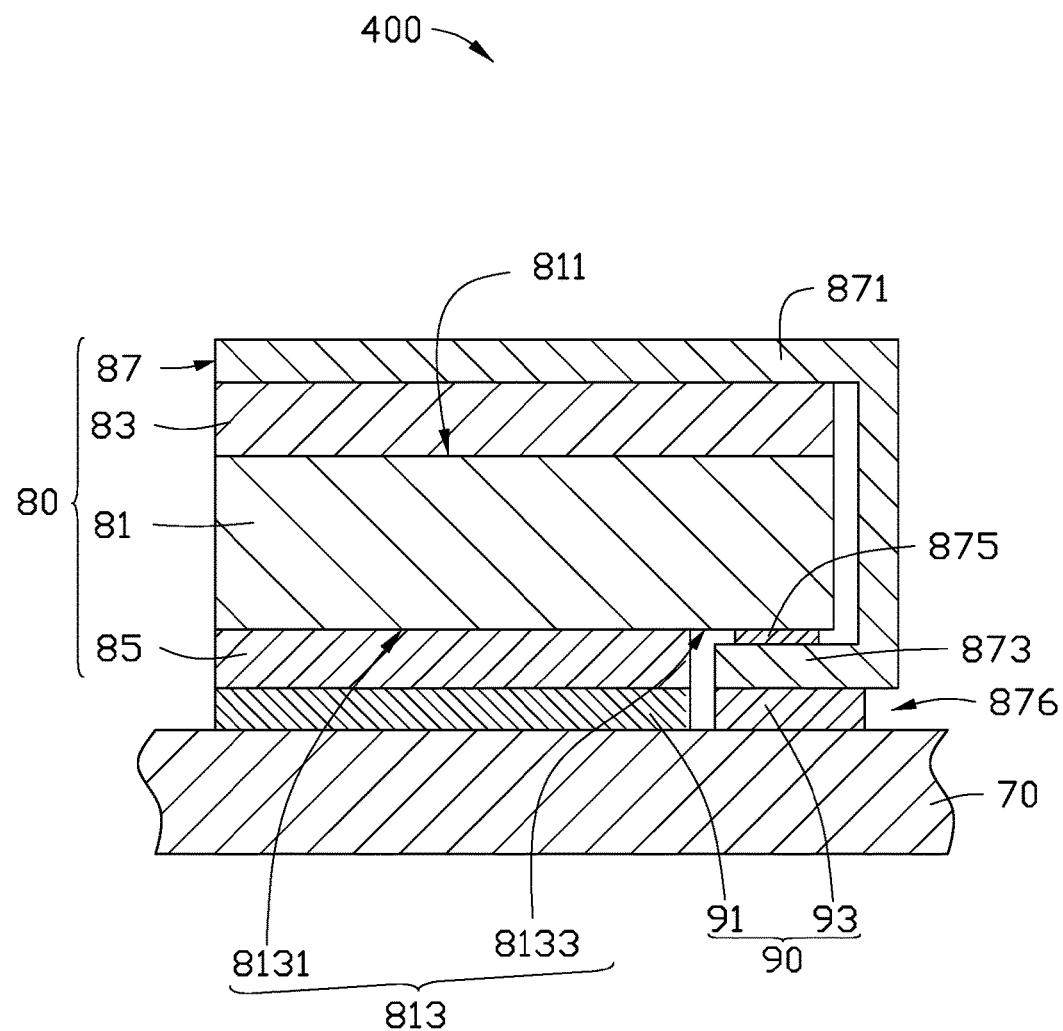
FIG. 5 is a cross-sectional view of a third exemplary embodiment of an electronic device with fingerprint identification function, the electronic device comprises a TFT substrate.

FIG. 5 illustrates a third exemplary embodiment of the electronic device 400. The electronic device 400 according to the third exemplary embodiment is similar to the electronic device 300. The electronic device 400 includes a substrate 70, a fingerprint identification structure 80, and an adhesive layer 90 between the substrate 70 and the fingerprint identification structure 80. The adhesive layer 90 joins the substrate 70 and the fingerprint identification structure 50 together. Differences between the electronic device 400 and the electronic device 300 will now be described.

The substrate 70 is substantially rectangular. In at least one exemplary embodiment, the substrate 70 is made of glass. The substrate 70 can prevent dust from entering into the electronic device 400. In other embodiments, the substrate 10 can be made of the same materials used in electronic device 300. The substrate 40 can be as previously described.

Figure 6:
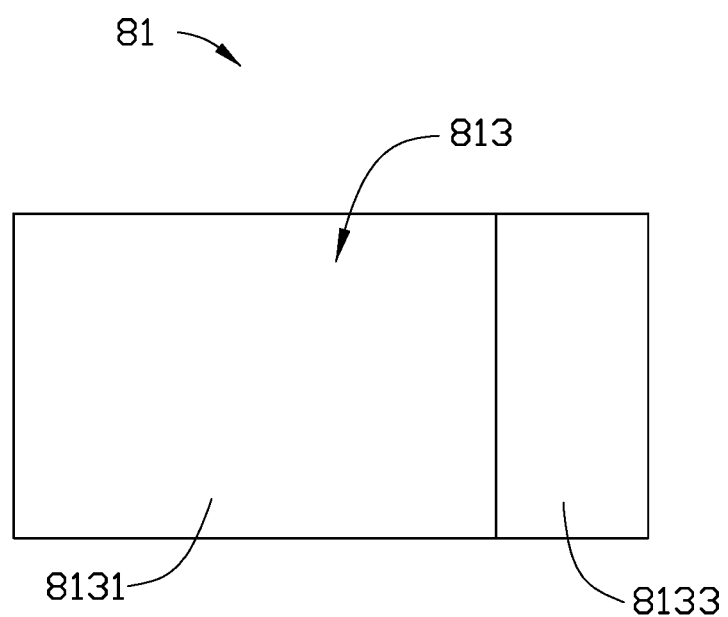
FIG. 6 is a plan view of the TFT substrate of FIG. 5.

The fingerprint identification structure 80 includes a thin film transistor (TFT) substrate 81, a transmitting layer 83, a receiving layer 85, and a flexible printed circuit (FPC) 87. TFT substrate 81 provides a specified voltage for controlling the transmitting layer 83 to generate ultrasonic signals. In at least one exemplary embodiment, the TFT substrate 81 includes a plurality of TFTs arranged in a matrix. The receiving layer 85 converts the ultrasonic signals reflected by an object into electrical signals. The TFT substrate 81 includes a first surface 811 facing away from the TFT substrate 81 and a second surface 813 opposite to and facing away from the first surface 811. The second surface 813 defines a first region 8131 and a second region 8133. As shown in FIG. 6, an area of the first region 8131 is larger than the second region 8133. The transmitting layer 83 is located on the first surface 811. The receiving layer 85 is located on the second surface 813, and covers the first region 2131. An edge of the receiving layer 55 is aligned with an edge of the first region 8131 adjacent to the second region 8133. The FPC 87 is located on the transmitting layer 83 and is bent to connect to the second region 8133 by extending along the side of the transmitting layer 83 and the side of the TFT substrate 81. The FPC 87 includes a first portion 871, a second portion 873, and a connection portion 875. The first portion 871 is located on a surface of the transmitting layer 83 facing away from the TFT substrate 81. The second portion 873 extends from an end of the first portion 871 to the second region 8133, and covers the side of the transmitting layer 83 and the side of the TFT substrate 81. The second portion 873 is spaced at a distance from the substrate 70. A space 876 is defined between the second portion 873 and the substrate 70. The connection portion 875 establishes an electrical connection between the second portion 873 and the TFT substrate 81. In at least one exemplary embodiment, the connection portion 875 can be metal pins, and the connection portion 875 can connect with the TFT substrate 81 by an anisotropic conductive film (not shown).

The adhesive layer 90 is located between the receiving layer 85 and the substrate 70. In at least one exemplary embodiment, the adhesive layer 90 is made of polymer material or equivalents thereof such as acrylic, epoxy, and silicone.

The adhesive layer 90 includes a first adhesive portion 91 and a second adhesive portion 93. The adhesive portion 91 is positioned on and pasted to a surface of the receiving layer 85 opposite to and facing away from the second surface 813. The adhesive portion 91 is further positioned on and pasted to a surface of the substrate 70. Thus, the adhesive portion 91 joins the receiving layer 85 and the substrate 70 together. The second adhesive portion 93 is received in the space 876. The second adhesive portion 93 is located between the second portion 873 and the substrate 70. The second adhesive portion 93 covers a surface of the second portion 873 facing the substrate 70. The second adhesive portion 93 joins the second portion 873 and the substrate 70 together. The space 876 is defined by the surface of the substrate 40, the surface of the second portion 873 facing the substrate 70, and an edge of the second adhesive portion 93. A thickness of the second adhesive portion 93 is equal to a distance between the second portion 873 and the substrate 70. A hardness of the second adhesive portion 93 is less than a hardness of the first adhesive portion 91. In at least one exemplary embodiment, the hardness of the second adhesive portion 93 is less than 60 shore according to ASTMD2240 standard.

In the structure of the electronic device 400, the second adhesive portion 93 is spaced apart from the first adhesive portion 91, thus movements or forces generated by the deforming of the second adhesive portion 93 is reduced, preventing the separation of FPC 87 from TFT substrate 81. The second portion 873 is spaced apart from the first adhesive portion 91, and force generated by the first adhesive portion 91 has no effect on the FPC 87. Therefore, an electric connection stability of the electronic device 400 is improved.

Figure 7:
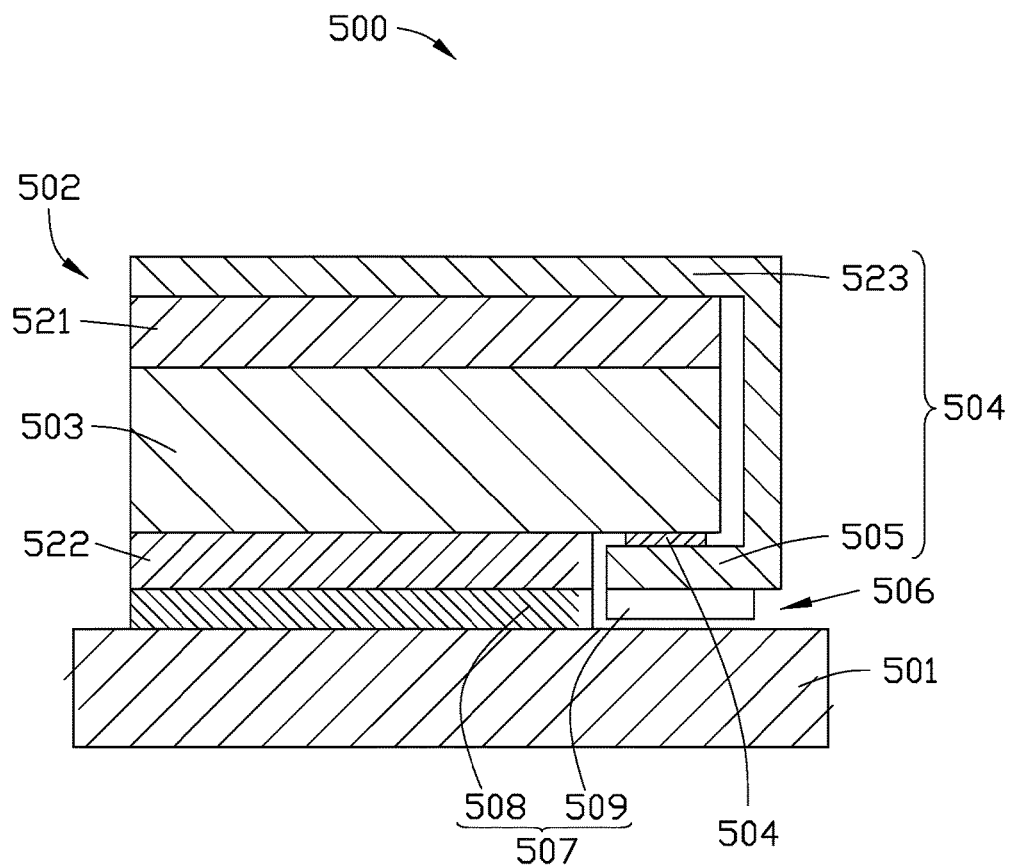
FIG. 7 is a cross-sectional view of a fourth exemplary embodiment of an electronic device with fingerprint identification function, the electronic device comprises a TFT substrate.
Figure 8:
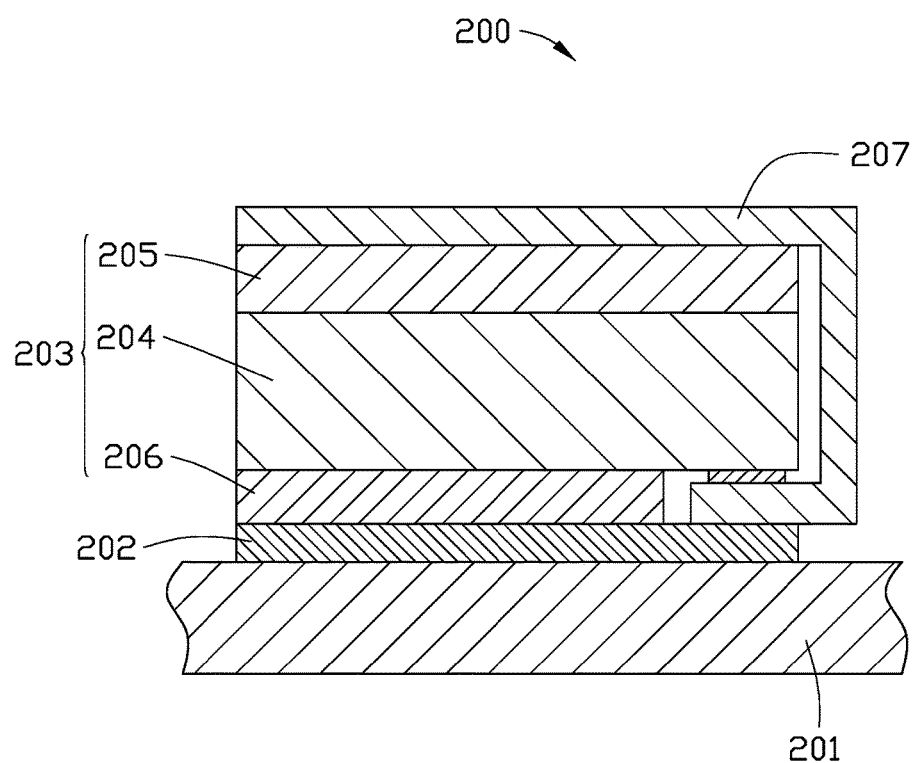
FIG. 8 is a cross-sectional view of an electronic device of related art with fingerprint identification function.

FIG. 7 illustrates a fourth exemplary embodiment of the electronic device 500. The electronic device 500 according to the fourth exemplary embodiment is similar to the electronic device 300. The electronic device 500 includes a substrate 501, a fingerprint identification structure 502, and an adhesive layer 507 between the substrate 501 and the fingerprint identification structure 502. The adhesive layer 507 joins the substrate 501 and the fingerprint identification structure 502 together. The differences between the electronic device 500 and the electronic device 300 will now be described.

The substrate 501 is substantially rectangular. In at least one exemplary embodiment, the substrate 501 is made of glass. The substrate 501 can prevent dust from entering into the electronic device 500. In other embodiments, the substrate 10 can be as previously described. The substrate 501 can be as previously described.

The fingerprint identification structure 502 includes a thin film transistor (TFT) substrate 503, a transmitting layer 521, a receiving layer 522, and a flexible printed circuit (FPC) 504. TFT substrate 503 provides a specified voltage for controlling the transmitting layer 521 to generate ultrasonic signals. In at least one exemplary embodiment, the TFT substrate 501 includes a plurality of TFTs arranged in a matrix. The receiving layer 522 converts the ultrasonic signals reflected by an object into electrical signals. The transmitting layer 521 is located on a surface of the TFT substrate 503 facing away from the substrate 501. The receiving layer 522 is located on a surface of the TFT substrate 503 facing away from the substrate 501. The FPC 504 is located on the transmitting layer 521 and is bent to connect to a surface of the TFT substrate 503 adjacent to the substrate 501 by extending along the side of the transmitting layer 521 and the side of the TFT substrate 503. The FPC 504 includes a first portion 523, a second portion 505, and a connection portion 524. The first portion 523 is located on a surface of the transmitting layer 521 facing away from the TFT substrate 503. The second portion 505 extends from an end of the first portion 523 to the TFT substrate 503, and covers the side of the transmitting layer 521 and the side of the TFT substrate 503. The second portion 505 is spaced apart from the substrate 501, and is electrically connected to the TFT substrate 503.

The adhesive layer 507 includes a first adhesive portion 508 and a second adhesive portion 509. The adhesive portion 508 is positioned on and pasted to a surface of the receiving layer 522 facing away from the TFT substrate 503. The adhesive portion 508 is further positioned on and pasted to a surface of the substrate 501. Thus, the adhesive portion 508 joins the receiving layer 522 and the substrate 501 together. The second adhesive portion 509 is received in the space 506. The second adhesive portion 509 is positioned on and pasted to the second portion 505 and is spaced apart from the substrate 501. The second adhesive portion 509 covers a surface of the second portion 505 facing the substrate 70. The second adhesive portion 509 joins the second portion 505 and the substrate 501 together. A thickness of the second adhesive portion 509 is equal to a distance between the second portion 505 and the substrate 501. A hardness of the second adhesive portion 509 is less than a hardness of the first adhesive portion 508. In at least one exemplary embodiment, the hardness of the second adhesive portion 509 is less than 60 shore according to ASTMD2240 standard.

In the structure of the electronic device 500, the second adhesive portion 509 is spaced apart from the substrate 501. Thus movement or forces generated by the deforming of the second adhesive portion 509 is reduced, preventing separation of the FPC 504 from the TFT substrate 503. The second portion 505 is spaced apart from the first adhesive portion 508, and forces generated by the first adhesive portion 508 have no effect on the FPC 503. Therefore, an electric connection stability of the electronic device 500 is improved.

While various exemplary and preferred embodiments have been described, the disclosure is not limited thereto. On the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. An electronic device with fingerprint identification function comprising:
   a substrate;
   a fingerprint identification structure comprising a thin film transistor (TFT) substrate and a flexible printed circuit (FPC), the fingerprint identification structure configured to identify fingerprint; and
   an adhesive layer located between the substrate and the fingerprint identification structure;
   wherein the FPC comprises a first portion and a second portion; the first portion is located on a surface of the TFT substrate facing away from the substrate; the second portion extends from an end of the first portion to be electrically connected to a surface of the TFT substrate facing the substrate; a space is defined between the second portion and the substrate; the second portion above the substrate extends towards the adhesive layer to be adjacent to and spaced apart from the adhesive layer.

2. The electronic device of claim 1, wherein a surface of the TFT substrate facing towards and adjacent to the substrate defines a first region and a second region; the second portion is electrically connected to the second region; the adhesive layer is positioned on and pasted to the first region.

3. The electronic device of claim 2, wherein the adhesive layer comprises a first adhesive portion positioned on and pasted to the first region and a second adhesive portion spaced apart from the first adhesive portion; the second adhesive portion is positioned between the second portion and the substrate, wherein the second adhesive portion is positioned on and pasted to a surface of the second portion facing towards the substrate; the second adhesive portion protects a surface of the second portion facing towards the substrate from being effected by moisture.

4. The electronic device of claim 2, wherein the second adhesive portion is separated from the substrate and fills a portion of a space between the second portion and the substrate.

5. The electronic device of claim 4, wherein a hardness of the first adhesive portion is equal to a hardness of the second adhesive portion.

6. The electronic device of claim 4, wherein a hardness of the first adhesive portion is larger than to a hardness of the second adhesive portion.

7. The electronic device of claim 3, wherein the second adhesive portion attaches to the substrate, and a hardness of the first adhesive portion is larger than a hardness of the second adhesive portion.

8. The electronic device of claim 7, wherein the fingerprint structure further comprises a transmitting layer and a receiving layer; the transmitting layer and the receiving layer are located on opposite surfaces of the TFT substrate; the first adhesive portion attaches the receiving layer and the substrate together; the FPC is located on the transmitting layer.

9. The electronic device of claim 4, wherein the hardness of the second adhesive portion is less than 60 based on an ASTMD2240 standard.

10. An electronic device with fingerprint identification function comprising:
    a substrate;
    a fingerprint identification structure with a thin film transistor (TFT) substrate and a flexible printed circuit (FPC), the fingerprint identification structure configured to identify fingerprint; and
    an adhesive layer located between the substrate and the fingerprint identification structure;
    wherein the adhesive layer comprises a first adhesive portion; a surface of the TFT substrate facing towards and adjacent to the substrate defines a first region and a second region; the FPC comprises a first portion and a second portion; the first portion is located on a surface of the TFT substrate facing away from the substrate; the second portion extends from an end of the first portion to be electrically connected to the second region; the first adhesive portion attaches the TFT substrate and the substrate together; the second portion is positioned on and separated from the first adhesive portion; the second adhesive portion protects a surface of the second portion facing towards the substrate from being effected by moisture.

11. The electronic device of claim 10, wherein the second adhesive portion is separated from the substrate and fills a portion of a space between the second portion and the substrate.

12. The electronic device of claim 11, wherein a hardness of the first adhesive portion is equal to a hardness of the second adhesive portion.

13. The electronic device of claim 11, wherein a hardness of the first adhesive portion is larger than to a hardness of the second adhesive portion the second adhesive portion connects with the substrate.

14. The electronic device of claim 10, wherein the second adhesive portion attaches to the substrate; a hardness of the first adhesive portion is larger than to a hardness of the second adhesive portion.

15. The electronic device of claim 10, wherein the hardness of the second adhesive portion is less than 60 based on an ASTMD2240 standard.

16. The electronic device of claim 10, wherein the fingerprint structure further comprises a transmitting layer and a receiving layer; the transmitting layer and the receiving layer are located on opposite surfaces of the TFT substrate; the first adhesive portion attaches the receiving layer and the substrate together; the FPC is located on the transmitting layer.

* * * * *